(12) United States Patent
    Watanabe (10) Patent No.: US 11,366,417 B2
(45) Date of Patent: Jun. 21, 2022

(54) POWER SUPPLY APPARATUS AND IMAGE FORMING APPARATUS

(71) Applicant: CANON KABUSHIKI KAISHA, Tokyo (JP)

(72) Inventor: Shuhei Watanabe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 92 days.

(21) Appl. No.: 17/018,230

(22) Filed: Sep. 11, 2020

(65) Prior Publication Data

US 2021/0084185 A1    Mar. 18, 2021

(30) Foreign Application Priority Data

Sep. 18, 2019 (JP) .............. JP2019-169710

(51) Int. Cl.
| G03G 15/00 | (2006.01) |
| H04N 1/00 | (2006.01) |
| H02M 7/00 | (2006.01) |
| H02M 7/219 | (2006.01) |
| H02M 3/335 | (2006.01) |
| H02M 7/217 | (2006.01) |
| H02M 1/00 | (2006.01) |

(52) U.S. Cl.
CPC ......... *G03G 15/5004* (2013.01); *G03G 15/80* (2013.01); *H02M 3/33515* (2013.01); *H02M 7/217* (2013.01); *H02M 7/219* (2013.01); *H04N 1/00888* (2013.01); *H02M 1/0025* (2021.05)

(58) Field of Classification Search
CPC .............. G03G 15/5004; G03G 15/80; H04N 1/00888; H04N 1/00904; H02M 1/0003; H02M 1/0025; H02M 1/40; H02M 3/33515; H02M 7/53; H02M 7/217; H02M 7/219
USPC ....... 399/37, 88, 89; 361/140; 323/247, 249, 323/301, 302, 355
See application file for complete search history.

(56) References Cited

U.S. PATENT DOCUMENTS

| 9,429,892 | B2 | 8/2016 | Watanabe et al. ......................... G03G 15/5029 |
| 2013/0033902 | A1* | 2/2013 | Zhang ............... H02M 3/33523 363/15 |
| 2014/0192560 | A1* | 7/2014 | Ou .................... H02M 3/33507 363/16 |
| 2015/0333764 | A1* | 11/2015 | Pastore .................. H03M 1/68 341/145 |
| 2016/0359418 | A1* | 12/2016 | Kawashima ............ H02M 1/44 |
| 2020/0195155 | A1* | 6/2020 | Colbeck ............ H02M 3/33569 |

FOREIGN PATENT DOCUMENTS

| JP | 2004-40911 A | 2/2004 |
| JP | 2008-224778 A | 9/2008 |

* cited by examiner

*Primary Examiner* — Robert B Beatty
(74) *Attorney, Agent, or Firm* — Venable LLP (57) ABSTRACT

The power supply apparatus includes a control unit configured to output a pulse signal for driving a switching element, to drive a transformer to output a voltage from a secondary winding of the transformer, and a memory unit configured to store information associating the output voltage with the duty and the frequency of the pulse signal, and the control unit switches the frequency and the duty based on the output voltage and the information stored in the memory unit.

9 Claims, 6 Drawing Sheets

FREQUENCY : f1
LOAD IMPEDANCE : R
INDUCTANCE : Lmax

POWER SUPPLY APPARATUS AND IMAGE FORMING APPARATUS

BACKGROUND OF THE INVENTION

Field of the Invention

The present invention relates to a power supply apparatus and an image forming apparatus, and particularly relates to an image forming apparatus using a transformer-type high-voltage power supply apparatus.

Description of the Related Art

For example, Japanese Patent Application Laid-Open No. 2008-224778 discloses, regarding a high voltage power supply, a method of conventionally controlling a transformer by using a table in which the output voltage of the transformer corresponds to the frequency of a driving pulse signal. On the other hand, Japanese Patent Application Laid-Open No. 2004-040911 discloses, as another conventional example, a method of controlling a transformer by using a memory storing information on the duty of a driving pulse signal corresponding to the output voltage of the transformer.

Usually, in a case where a transformer is controlled by the frequency of a driving pulse signal, the output voltage reaches a peak value at a predetermined frequency, and a higher voltage cannot be output. Additionally, in a case where the transformer is controlled by the duty of the driving pulse signal, when the on-width is increased to a predetermined width, the transformer is saturated, or the power of a field effect transistor (FET) turned on/off by the driving pulse signal is increased. Therefore, it is necessary to set the on-width to a predetermined value or less. In this manner, in a case where the transformer is controlled by the frequency or duty of the driving pulse signal, the variable width of the output voltage is restricted. Accordingly, since a higher output transformer and a higher power FET are required to further extend the range of the output voltage, there is a problem that the cost and size of an apparatus is increased.

SUMMARY OF THE INVENTION

One aspect of the present invention is a power supply apparatus including a transformer including a primary winding and a secondary winding, a switching element connected to the primary winding, the switching element configured to turn on or turn off a voltage applied to the primary winding of the transformer according to an input pulse signal, a control unit configured to drive the transformer and output the pulse signal to the switching element, to output an output voltage from the power supply apparatus, according to a voltage induced by the secondary winding of the transformer, and a memory unit configured to store information associating the output voltage with a duty and a frequency of the pulse signal, wherein the control unit switches the frequency and the duty based on the output voltage and the information stored in the memory unit.

Another aspect of the present invention is an image forming apparatus including an image bearing member, an image forming unit configured to act on the image bearing member, and a power supply apparatus configured to supply a high voltage to the image forming unit, the power supply apparatus including a transformer including a primary winding and a secondary winding, a switching element connected to the primary winding, the switching element configured to turn on or turn off a voltage applied to the primary winding of the transformer according to an input pulse signal, a control unit configured to drive the transformer and output the pulse signal to the switching element, to output an output voltage from the power supply apparatus, according to a voltage induced by the secondary winding of the transformer; and a memory unit configured to store information associating the output voltage with a duty and a frequency of the pulse signal, wherein the control unit switches the frequency and the duty based on the output voltage and the information stored in the memory unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, referring to the drawings, a preferred embodiment of this invention will be exemplarily described in detail. However, the components described in this embodiment are merely illustrations, and are not intended to limit the scope of this invention to only those.

Embodiment 1

[Power Supply Apparatus]

Figure 1:
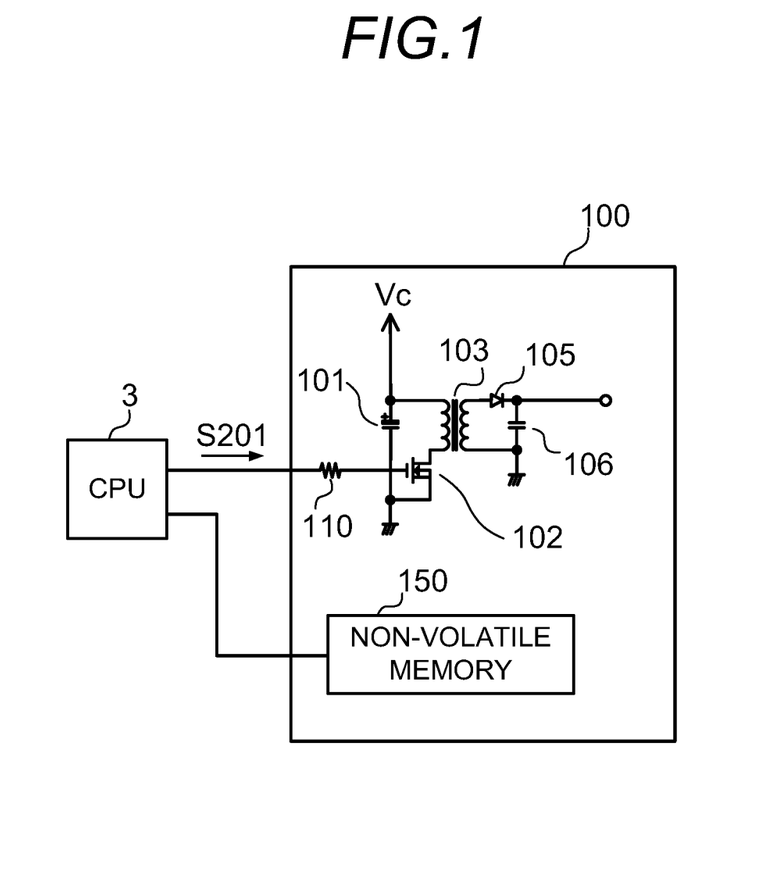
FIG. 1 is a block diagram of a power supply unit of Embodiment 1.

FIG. 1 illustrates a block diagram and a circuit diagram of a high-voltage power supply apparatus of Embodiment 1. The high-voltage power supply apparatus includes a power supply unit 100 that generates a high voltage, and a CPU 3 that controls the power supply unit 100. The power supply unit 100 includes a resistor 110, a smoothing capacitor 101, a field effect transistor (hereinafter called the FET) 102, which is a switching element, a transformer 103 including a primary winding and a secondary winding, a high voltage diode 105, and a high voltage capacitor 106.

The CPU 3 outputs a driving signal S201 to the power supply unit 100 via the resistor 110. The power supply unit 100 switches the voltage (voltage Vc (voltage of the smoothing capacitor 101)) applied to the primary winding of the transformer 103 by intermittently switching the FET 102 with the driving signal S201. That is, the FET 102 is connected to the primary winding, and turns on or turns off the voltage applied to the primary winding of the transformer 103 according to the driving signal S201, which is an input pulse signal. The CPU 3 outputs the driving signal S201 to the FET 102, and controls the driving of the transformer 103. Accordingly, the power supply unit 100 increases the switched voltage to be a high voltage, and outputs the voltage to the secondary winding of the transformer 103. Then, the high voltage is rectified and smoothened by the high voltage diode 105 and the high voltage capacitor 106, and a DC voltage is generated with a high value. In this manner, the power supply unit 100 outputs the output voltage according to the voltage induced by the secondary winding of the transformer 103.

The DC voltage having the high voltage can be adjusted by changing the frequency and duty of the driving signal S201. Additionally, the power supply unit 100 includes a non-volatile memory 150 as a memory unit, and the CPU 3 controls the non-volatile memory 150 by a communication system such as the I2C system. Note that the driving signal S201 is a square wave pulse signal, and the duty means the period (time) of the one cycle of the pulse signal during which the level of the signal is at a high-level.

The power supply unit 100 of Embodiment 1 does not include a unit for feeding back the generated DC voltage having the high voltage. In the circuit configuration that does not feed back the DC voltage having the high voltage, depending on the difference in the inductance value of the transformer 103, the output characteristics will also be different for each case. The inductance value of the transformer 103 naturally occurs due to manufacturing variation.

[Output Characteristics of Power Supply Unit]

Figure 2A:
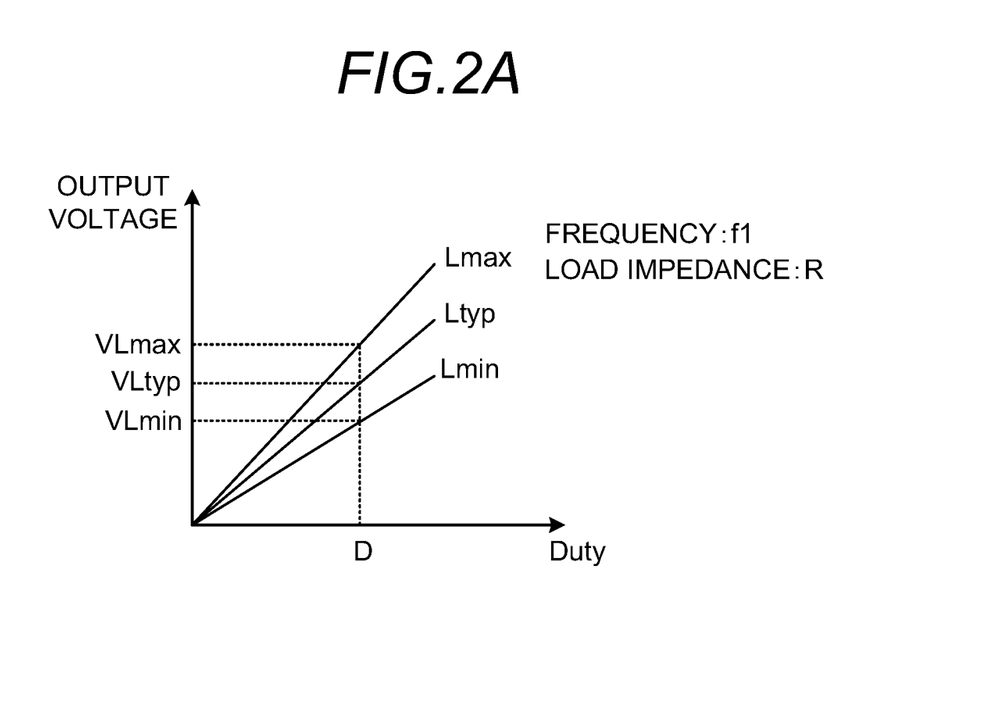
FIG. 2A and FIG. 2B are diagrams illustrating the output characteristics of a transformer of Embodiments 1 to 4.

FIG. 2A illustrates the output characteristics of the high voltage with respect to the on-duty (hereinafter simply written as the duty) of the driving signal S201 in the power supply unit 100 in FIG. 1. Note that the duty of the driving signal S201 may be controlled in off-duty. In FIG. 2A, the horizontal axis represents the duty, and the vertical axis represents the DC voltage (hereinafter also called the output voltage) having the high voltage.

Three transformers having different inductance values that occur due to manufacturing variation are used for the transformer 103, and it is assumed that the respective inductance values (hereinafter called an L value) are Lmin, Ltyp and Lmax (Lmin<Ltyp<Lmax). It is assumed that the frequency f of the driving signal S201 is f1, and the load impedance is R. The output voltage in a case where the duty is D will be a different value depending on the transformer 103 as illustrated in FIG. 2A. Specifically, when the duty of the driving signal S201 is D, the output voltage of the transformer 103 having the L value of Lmin will be VLmin. When the duty of the driving signal S201 is D, the output voltage of the transformer 103 having the L value of Ltyp will be VLtyp. When the duty of the driving signal S201 is D, the output voltage of the transformer 103 having the L value of Lmax will be VLmax. Note that the relationship VLmin<VLtyp<VLmax is established.

In this manner, in a case where the output voltage is controlled to be a constant value in the circuit configuration that does not perform feedback control, in consideration of variation in the L value of the transformer 103, it is necessary to adjust the frequency f and the duty D of the driving signal S201 for each apparatus. As the method, a method of measuring the output characteristics of the power supply unit 100 in advance, and storing the output characteristics in the non-volatile memory 150, etc. is known. The output characteristics are measured in, for example, the manufacturing line of the power supply unit 100. In this manner, by measuring the output characteristics of the power supply unit 100 in advance, the output voltage can be controlled to be an arbitrary value, independently of the L value variation of the transformer 103.

[Relationship Between Driving Signal and Output Characteristics]

Figure 2B:
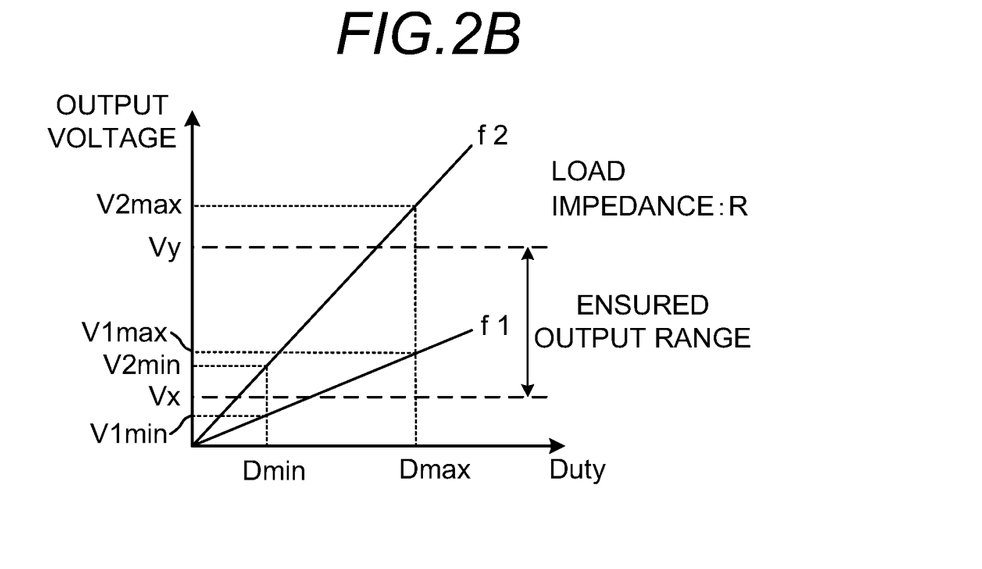

The high voltage output characteristics illustrated in FIG. 2B illustrate the output voltage in a case where the frequency f and the duty D of the driving signal S201 is changed in the power supply unit 100 in FIG. 1. The horizontal axis is the duty D of the driving signal S201, the vertical axis is the output voltage, and the output characteristics in respective cases where the frequency of the driving signal S201 is set to f1 and f2 (>f1) are illustrated. Further, it is assumed that the load impedance is a constant value R. Generally, in a high voltage inverter transformer, when the duty of a driving signal is excessively increased, the transformer is saturated, or the power consumption of an FET is increased. Therefore, it is necessary to set the value of the duty of a driving signal to the value of the duty with which safety is secured. Additionally, since there is a possibility that the output characteristics may not be stabilized when the duty of the driving signal is excessively decreased, it is necessary to set to the value of the duty that can be stably controlled.

From these viewpoints, it is assumed that the acceptable minimum and maximum duties D are set to Dmin and Dmax, respectively. In this case, as illustrated in FIG. 2B, it is assumed that, in a case where the frequency f of the driving signal S201 is f1, the output voltage at the time of the minimum duty Dmin is V1min, and the output voltage at the time of the maximum on-duty Dmax is V1max. Additionally, it is assumed that, in a case where the frequency f of the driving signal S201 is f2, the output voltage at the time of the minimum duty Dmin is V2min, and the output voltage at the time of the maximum duty Dmax is V2max. Then, the voltage range that can be output in a case where the frequency f of the driving signal S201 is f1 is V1min to V1max. On the other hand, the voltage range that can be output in a case where the frequency f of the driving signal S201 is f2 is V2min to V2max.

Here, it is assumed that, in the load impedance R, the range of the output voltage value guaranteed as the output capability of the power supply unit 100 (hereinafter called the guaranteed output range) is Vx to Vy. For example, the minimum value Vx of the guaranteed output range is within the range of V1min and V2min (V1min≤Vx≤V2min), and the maximum value Vy of the guaranteed output range is within the range of V1max and V2max (V1max≤Vy≤V2max). In a case where the frequency f of the driving signal S201 is f1, since Vy>V1max, the high voltage side cannot be output. Conversely, in a case where the frequency f of the driving signal S201 is f2, since Vx<V2min, the low voltage side cannot be output.

Therefore, in a case where the output voltage equal to or less than V2min is output, the frequency f of the driving signal S201 is set to f1, and in a case where the voltage equal to or more than V1max is output, the frequency f of the driving signal S201 is set to f2. Accordingly, the required output range can be satisfied. Note that, since the range equal to or more than V2min and equal to or less than V1max can be output regardless of whether the frequency f of the driving signal S201 is f1 or f2, the frequency f may be arbitrarily selected.

As described above, by performing variable control of both the frequency f and duty D of the driving signal S201, the output range of the high voltage can be extended, and a wide range of required specification can be met. Although there is a method of using a high-output transformer or using an input voltage adjustment circuit as another measure for extending the output range, since both of these increase the cost of an apparatus, it can be said that the method of Embodiment 1 is a measure that can be realized with an inexpensive configuration.

[Selecting Method of Frequency and Duty of Driving Signal]

Next, a method of selecting the frequency f and the duty D of the driving signal S201 by using information (a table) in the non-volatile memory 150, which is a feature of Embodiment 1, will be described. The table, which is the information representing the characteristics of the output voltage of the power supply unit 100, is stored in the non-volatile memory 150 in advance.

TABLE 1

| Output voltage | Duty | Frequency |
|---|---|---|
| V1min | Dmin | f1 |
| V1 | D1 | |
| V2 | D2 | |
| . | . | |
| . | . | |
| . | . | |
| V2min | Dmin | f2 |
| . | D1 | |
| . | D2 | |
| . | . | |
| V2max | . | |
| | . | |
| | Dmax | |

Table 1 illustrates an example of the table stored in the non-volatile memory 150. The table defines the corresponding relationship among the output voltage, the duty of the driving signal S201 for outputting the output voltage, and the frequency f. For example, the Duty Dmin and the frequency f1 of the driving signal S201 are associated with the output voltage Vmin. The higher the duty D of the driving signal S201, the higher the output voltage of the power supply unit 100, and the higher the frequency f of the driving signal S201, the higher the output voltage of the power supply unit 100.

Hereinafter, the content of the table will be specifically described to correspond to the output characteristics in FIG. 2B. The range of the output voltage is V1min to V2max, and the frequency f and the duty D corresponding to the minimum value V1min of the output voltage are f1 and Dmin, respectively. In the area where the output voltage is low, the frequency f of the driving signal S201 is fixed to f1, and in response to the output voltage changed to V1, V2 (>V1) . . . at a predetermined resolution, the duty D is changed to D1, D2 (>D1) . . . .

When the output voltage reaches V2min, the frequency f of the driving signal S201 is switched to f2, and the duty D is reset to Dmin. In the area where the output voltage is equal to or more than V2min, the frequency f of the driving signal S201 is fixed to f2, and in response to the output voltage changed, the duty D is changed to D1, D2 . . . . The frequency f and the duty D corresponding to the maximum value V2max of the output voltage are f2 and Dmax, respectively.

The CPU 3 communicates with the non-volatile memory 150 to refer to Table 1 stored in the non-volatile memory 150. The CPU 3 selects the frequency f and the duty D of the driving signal S201 from the table, according to the output voltage supplied by the power supply unit 100 to the load of an image forming apparatus. Then, the CPU 3 causes an arbitrary output voltage to be generated by controlling the driving signal S201 with the selected frequency f and duty D.

Note that, in Table 1, switching of the frequency f of the driving signal S201 is performed at the timing when the output voltage reaches V2min. As described above, in the area where the output voltage is between V2min and V1max, the frequency f of the driving signal S201 may be f1 or f2. Therefore, the frequency f of the driving signal S201 may be switched from f1 to f2 when the output voltage is V1max (the duty D is Dmax). In this case, the duty of the driving signal S201 will be reset to the duty (>Dmin) corresponding to the output voltage of V1max in a case of the frequency f2.

In this manner, the following information is set to Table 1 of Embodiment 1. That is, f1, which is a first frequency corresponding to V1min to V2min, which is a first voltage range, and f2, which is a second frequency higher than the first frequency and corresponding to V2min to V2max, which is a second voltage range continuing from the first voltage range, are set. In a case where the output voltage is changed within the first voltage range, the CPU 3 changes the duty D of the driving signal S201 in a state where f1 is selected as the frequency f of the driving signal S201. Additionally, in a case where the output voltage is changed within the second voltage range, the CPU 3 changes the duty D of the driving signal S201 in a state where f2 is selected as the frequency f of the driving signal S201.

As described above, according to Embodiment 1, a power supply apparatus can be provided that has an inexpensive configuration, is not influenced by the inductance value variation of a transformer, and corresponds to a wide output voltage range. Note that, although the frequency f of the driving signal S201 is set to the two levels f1 and f2 in the table described in Embodiment 1, three or more levels may be used. Further, although the table has been described in which the frequency f is switched and the output voltage corresponds to the duty D in each area, this relationship between the frequency f and the duty D may be reversed. That is, a table may be used in which the duty D is switched in a plurality of areas, and the output voltage corresponds to the frequency f in each area.

That is, the following information may be set to Table 1. A first duty corresponding to the first voltage range, and a second duty higher than the first duty and corresponding to the second voltage range continuing from the first voltage range may be set. In a case where the output voltage is changed within the first voltage range, the CPU 3 changes the frequency f of the driving signal S201 in a state where the first duty is selected as the duty D of the driving signal S201. Additionally, in a case where the output voltage is changed within the second voltage range, the CPU 3 changes the frequency f of the driving signal S201 in a state where the second duty is selected as the duty D of the driving signal S201. These modifications may select an appropriate table configuration according to the characteristics of a transformer and the circuit configuration. In this manner, the information associating the output voltage of the power supply unit 200 with the duty and frequency of the driving signal S201 is stored in the non-volatile memory 150. The CPU 3 switches the frequency or duty of the driving signal S201, based on the output voltage and the table, which is the information stored in the non-volatile memory 150.

As mentioned above, according to Embodiment 1, the influence due to the variation in the inductance value of a transformer can be suppressed, and the output in a wide voltage range can be enabled with an inexpensive configuration.

Embodiment 2

[Power Supply Apparatus]

Figure 3A:
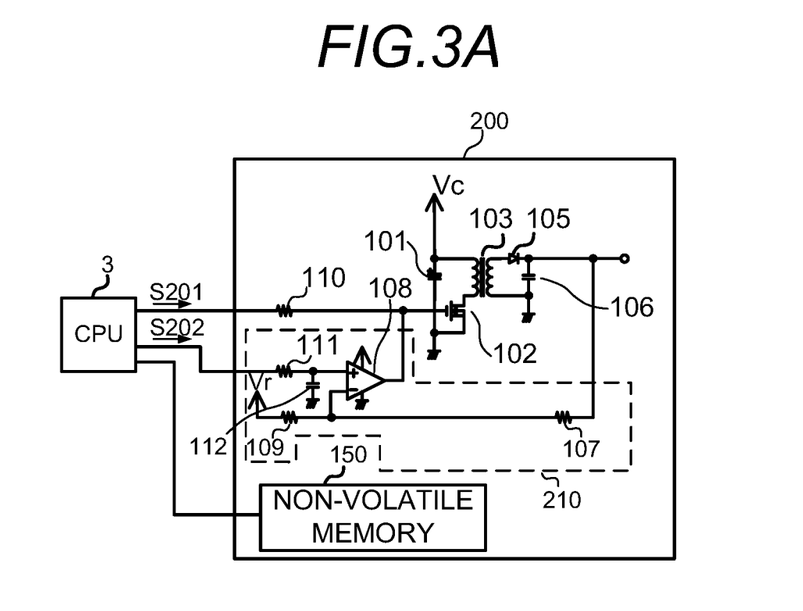
FIG. 3A illustrates a block diagram of the power supply unit of Embodiment 2.

FIG. 3A illustrates a block diagram and a circuit diagram of a power supply unit 200 of Embodiment 2. The power supply unit 200 of FIG. 3A has the advantage that feedback control can be performed with a less number of components and an inexpensive configuration. On the other hand, the power supply unit 200 has the problem that ripple of the output voltage is easily generated. In Embodiment 2, a method of suppressing ripple of the output voltage by using a table stored in the non-volatile memory 150 will be described.

[Feedback Control]

First, regarding the circuit operation, since the drive control of the transformer 103 is the same as that of Embodiment 1, a description is omitted, and feedback control will be described. A feedback unit 210, which is a feedback unit, includes a comparator 108, resistors 107, 109 and 111, and a capacitor 112. In the feedback unit 210, a PWM signal S202 from the CPU 3 is smoothened by the resistor 111 and the capacitor 112, converted into a DC voltage according to the duty of the PWM signal S202, and is input to the + input terminal (non-inverted input terminal) of the comparator 108. The duty of this PWM signal S202 serves as a target value of the output voltage of the power supply unit 200, and the duty of the PWM signal S202 and the output voltage have a proportional relationship. That is, the longer the duty of the PWM signal S202, the higher the output voltage.

The output voltage is stepped down by the resistor 107, and a feedback voltage divided by a reference voltage Vr, the resistor 107 and the resistor 109 is input to the − input terminal (inverted input terminal) of the comparator 108. In a case where the output voltage is increased, and the feedback voltage that is input to the − input terminal of the comparator 108 exceeds the target voltage that is input to the + input terminal, the output of the comparator 108 will be at a low level, and the gate voltage of the FET 102 will be 0V. This state is called "the state where the driving signal S201 is decimated." When the driving signal S201 is decimated, since the driving of the transformer 103 is stopped, the output voltage is decreased. In this manner, in a case where the feedback voltage is higher than the target value, the feedback unit 210 stops the driving of the transformer 103 by the FET 102, independently of the driving signal S201. Thereafter, when the feedback voltage is below the target voltage, the FET 102 resumes oscillation, and the output voltage is increased again. The output voltage is maintained by repeating such an operation.

Figure 3B:
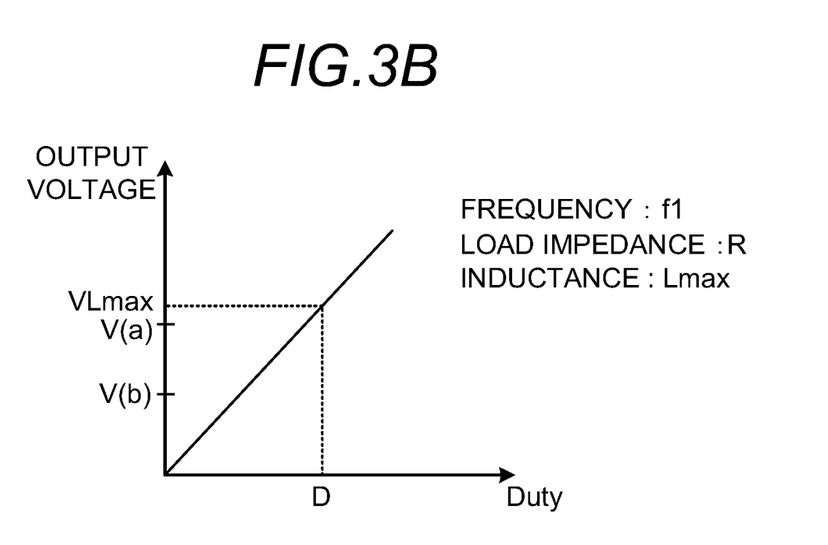
FIG. 3B illustrates a diagram illustrating the output characteristics of the transformer of Embodiment 2.
Figure 4A:
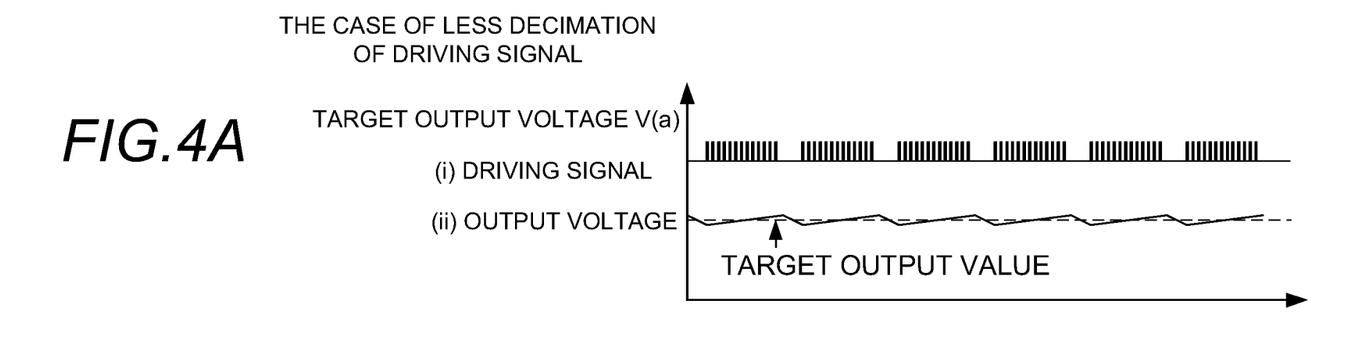
FIG. 4A and FIG. 4B are diagrams illustrating the output waveforms of the power supply unit of Embodiment 2.
Figure 4B:
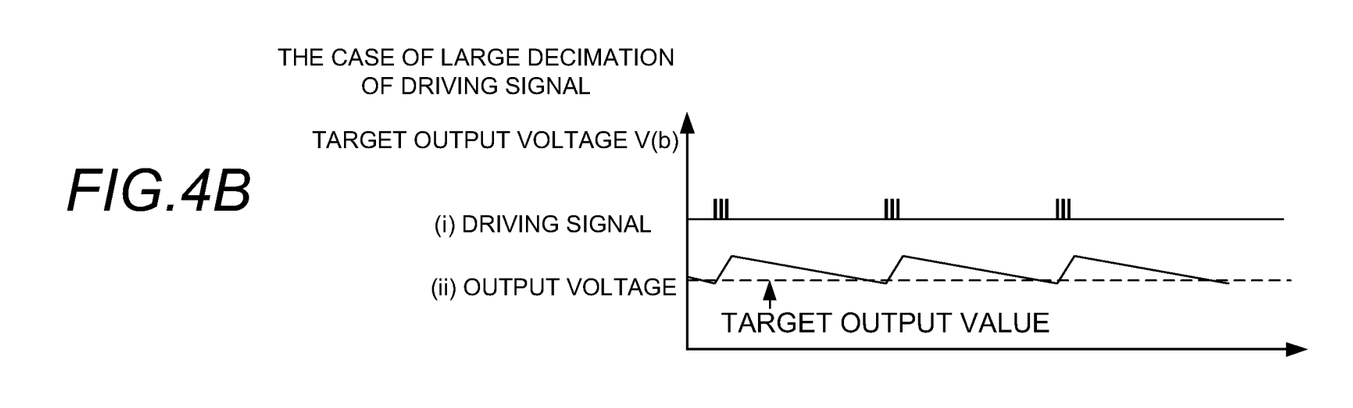

Since the power supply unit 200 of Embodiment 2 has such a circuit operation, inevitably, the ripple of the output voltage is easily generated. Furthermore, the ripple of the output voltage is correlated with the output voltage serving as a target (hereinafter called the target output voltage). FIG. 3B and FIG. 4A and FIG. 4B illustrate the output characteristics and the output waveforms of the power supply unit 200, respectively. In FIG. 3B, the horizontal axis represents the duty of the driving signal S201, and the vertical axis represents the output voltage of the power supply unit 200. FIG. 4A illustrates each waveform in a case where the output voltage is V(a), and FIG. 4B illustrates each waveform in a case where the output voltage is V(b) (<V(a)). Specifically, FIG. 4A and FIG. 4B illustrate the waveforms (i) of the driving signal S201, and the output voltages (ii) of the power supply unit 200. In FIG. 4A and FIG. 4B, a broken line indicates the target output voltage (output target value) for the output voltage (ii).

From FIG. 3B, in a case where it is assumed that the frequency f of the driving signal S201 is f1, and the duty is D, the maximum output voltage of the power supply unit 200 is VLmax. Here, in FIG. 3B, the load impedance is R, and the transformer 103 having the L value of Lmax is used. In a case where the target output voltage is V(a) close to the maximum output voltage VLmax, as illustrated by the waveform in FIG. 4A, since there is less decimation of the driving signal S201, there is less ripple of the output voltage. On the other hand, in a case where the target output voltage is V(b) lower than V(a), as illustrated by the waveform in FIG. 4B, the decimation of the driving signal S201 is increased compared with that in FIG. 4A, and the ripple of the output voltage is increased.

That is, in order to suppress the ripple of the output voltage, the frequency f and the duty D of the driving signal S201 may be adjusted, and the difference between the output voltage of the power supply unit 200 and the target output voltage may be made small. Ideally, the drive may be performed in a state where the output voltage is made equal to the target output voltage, so that the driving signal S201 is not decimated at all. However, it is conceivable that the output characteristics of the power supply unit 200 are changed due to the influences by the parts variation of the load of the image forming apparatus, and the load variation caused by circumstance temperature and humidity, etc. Considering the possibility that the output capability of the power supply unit 200 is insufficient due to this influence, the drive condition can be such that the output capability slightly higher than the target output voltage is provided.

Next, a method of applying an output characteristics table of the present invention to the power supply unit 200 of Embodiment 2 will be described. As described in Embodiment 1, the output characteristics of the power supply unit 200 also have variation due to the variation in the inductance value of the transformer 103. In a case where the output characteristics of FIG. 2A have variation, it is necessary to set the values of the frequency f and the duty D of the driving signal S201 to be able to output the target output voltage also at Lmin. However, in a case where a component is driven with which the inductance value becomes Lmax with the same setting values, since the difference between the output voltage and the target output voltage becomes large, the ripple of the output voltage will also become high.

Therefore, since appropriate frequency f and duty D can be selected according to the variation in the inductance value by storing the output characteristics table of the power supply unit 200 in advance in the non-volatile memory 150, the ripple of the output voltage can be suppressed. Regarding the content of the table and the control method, a description is omitted, since these are the same as those of Embodiment 1.

As described above, according to Embodiment 2, a high-voltage power supply apparatus that suppresses the ripple of the output voltage can be provided, while having an inexpensive circuit configuration that maintains the output voltage constant by decimating the driving signal. As mentioned above, according to Embodiment 2, the influence due to the variation in the inductance value of a transformer can be suppressed, and the output in a wide voltage range can be enabled with an inexpensive configuration.

Embodiment 3

In Embodiment 1 and Embodiment 2, the methods are described that select appropriate drive conditions by storing the output characteristics tables of the power supply units 100 and 200 in the non-volatile memory 150 in advance. These are based on the assumption that the load of the image forming apparatus can also be predicted in advance. For example, loads, such as a paper and a photosensitive drum in the case of charge processing, and a paper and a transfer roller in the case of transfer processing, are determined. Therefore, the load of the image forming apparatus can be predicted to some extent. However, as previously mentioned, since the resistance value of the load is changed with the parts variation, the circumstance temperature and humidity, the absorbing state of a paper, etc., a design considering such variations in the resistance value of the load is required. Therefore, in Embodiment 3, a method of monitoring the resistance of the load by using a load current detection circuit, and setting an appropriate drive condition will be described.

[Power Supply Apparatus]

Figure 5:
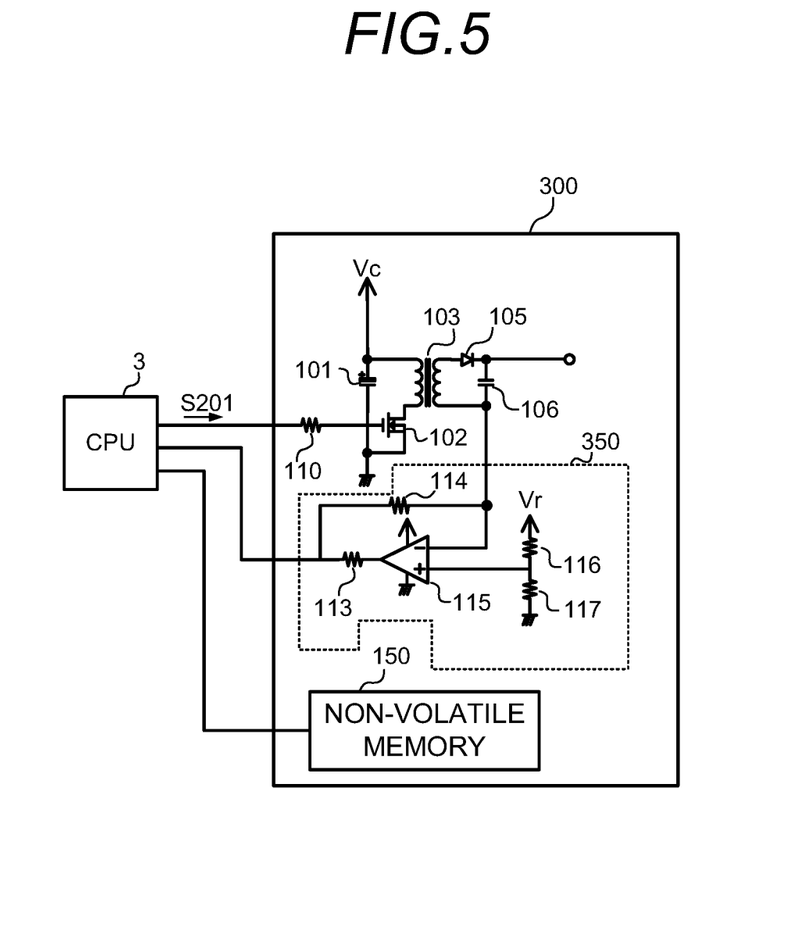
FIG. 5 illustrates a block diagram of the power supply unit of Embodiment 3.

FIG. 5 illustrates a block diagram and a circuit diagram of a power supply unit 300 in Embodiment 3. Since the drive control of the transformer 103 is the same as that in Embodiment 1, a description is omitted, and a load current detection circuit 350, which is a detection unit to detect the current flowing to a load, will be described. The load current detection circuit 350 includes resistors 113, 114, 116 and 117, and an operational amplifier 115.

The current flowing to the secondary side of the transformer 103 is supplied from the power supply unit 300 to the load of an image forming apparatus, and returns to the transformer 103 from the GND of the operational amplifier 115 through the resistor 113 and the resistor 114. Accordingly, the load current can be calculated in a case where the voltage difference between the both ends of the resistor 114 is known. Since the voltage of the + input terminal of the operational amplifier 115 is determined by the divided voltage of the voltage Vr by the resistor 116 and the resistor 117, the voltage of the + input terminal of the operational amplifier 115 is known. Additionally, since the voltage between the resistor 113 and the resistor 114 is connected to an AD port of the CPU 3, the CPU 3 can calculate the load current value from the AD value that is input to the AD port.

[Output Characteristics Table]

Table 2 illustrates the content of an output characteristics table in Embodiment 3. A plurality of tables corresponding to the load current value are stored in the non-volatile memory 150 in advance. These tables offset the change in the output characteristics by changing the frequency f of the driving signal S201 in response to the change in the output characteristics due to the influence of load variation.

TABLE 2

| Table A  Load voltage < I1 | | |
|---|---|---|
| Output voltage | Duty | Frequency |
| V1min | Dmin | f11 |
| V1 | D1 | |
| V2 | D2 | |
| . | . | |
| . | . | |
| . | . | |
| V2min | Dmin | f12 |
| . | D1 | |
| . | D2 | |
| . | . | |
| V2max | . | |
| | . | |

TABLE 2-continued

| Table B  I1 ≤ Load voltage < I2 | | |
|---|---|---|
| Output voltage | Duty | Frequency |
| V1min | Dmin | f21 |
| V1 | D1 | |
| V2 | D2 | |
| . | . | |
| . | . | |
| . | . | |
| V2min | Dmin | f22 |
| . | D1 | |
| . | D2 | |
| . | . | |
| V2max | . | |
| | . | |
| | Dmax | |

| Table C  I2 ≤ Load voltage | | |
|---|---|---|
| Output voltage | Duty | Frequency |
| V1min | Dmin | f31 |
| V1 | D1 | |
| V2 | D2 | |
| . | . | |
| . | . | |
| . | . | |
| V2min | Dmin | f32 |
| . | D1 | |
| . | D2 | |
| . | . | |
| V2max | . | |
| | . | |
| | Dmax | |

Each of Table A, Table B and Table C in Table 2 includes information similar to the table described for Table 1 in Embodiment 1. The non-volatile memory 150 stores the plurality of Tables A to C corresponding to the current flowing to the load. Note that, in Table A, the frequency f is switched between f11 and f12 (>f11). In Table B, the frequency f is switched between f21 and 122 (>f21). In the table 3, the frequency f is switched between f31 and f32 (>f31).

In a case where the detection result of the load current by the load current detection circuit 350 is less than I1 (the load current<I1), the CPU 3 selects the table A. In a case where the detection result of the load current by the load current detection circuit 350 is equal to or more than I1 and less than I2 (I1≤the load current<I2), the CPU 3 selects the Table B. In a case where the detection result of the load current by the load current detection circuit 350 is equal to or more than I2 (I2≤the load current), the CPU 3 selects the table C. In this manner, the CPU 3 selects one table from the plurality of Tables A to C stored in the non-volatile memory 150 according to the current detected by the load current detection circuit 350, and sets the duty D and the frequency f of the driving signal S201. Then, based on the selected table, the CPU 3 controls the driving signal S201 under the conditions (the output voltage and the frequency for the duty) set in the table.

Note that, in Embodiment 3, although the tables are used in which the frequency f is changed according to the difference in the load current, this is not a limitation. The duty D of the driving signal S201 can be changed correspondingly, or a plurality of tables can be changed by changing both the frequency f and the duty D. Additionally, although selection is made from the three tables according to the load current value in Table B, the number of tables is arbitrary. The content and number of these tables may be appropriately selected for each apparatus, according to the load characteristics of the power supply unit 300, the variation width of the load resistance of the image forming apparatus, the output accuracy of the required high voltage, etc.

Additionally, in Embodiment 3, although the method of actually monitoring the load current by the load current detection circuit 350 has been described, the variation in the load resistance can be predicted by using a sensor, which is a circumstance detection unit to detect the circumstance temperature and humidity. In this case, the non-volatile memory 150, which is a memory unit, stores a plurality of tables corresponding to the temperature and/or humidity. Based on the detection result of the sensor, the CPU 3 may select an appropriate table from the plurality of tables stored in the non-volatile memory 150 in advance according to the circumference temperature and humidity. That is, the CPU 3 may select one table from the plurality of tables stored in the non-volatile memory 150 according to the temperature and/or humidity, and may set the duty D and the frequency f of the driving signal S201. As described above, according to Embodiment 3, a high-voltage power supply apparatus can be provided that can stably control the output voltage with an inexpensive configuration, even in a case where the output characteristics of the high-voltage power supply apparatus are changed due to the influence of the load variation. Note that the load current detection circuit (monitor) and the sensor described in Embodiment 3 can also be applied to a circuit to decimate the driving signal S201 described in Embodiment 2, and a combination is arbitrary.

As mentioned above, according to Embodiment 3, the influence due to the variation in the inductance value of a transformer can be suppressed, and the output in a wide voltage range can be achieved with an inexpensive configuration.

Embodiment 4

The power supply units 100, 200 and 300 of Embodiments 1 to 3 can be applied as a high-voltage power supply apparatus used for an electrophotography-type image forming apparatus, such as a laser printer. The high-voltage power supply apparatus supplies a high voltage to a load for which the high voltage is required in an image forming unit of the image forming apparatus. For example, there are a charge unit that charges an image bearing member, a developing unit that develops a latent image formed on the image bearing member, a transfer unit that transfers a toner image formed on the image bearing member to a recording material, etc. Hereinafter, the image forming apparatus will be described.

[Description of Laser Beam Printer]

Figure 6:
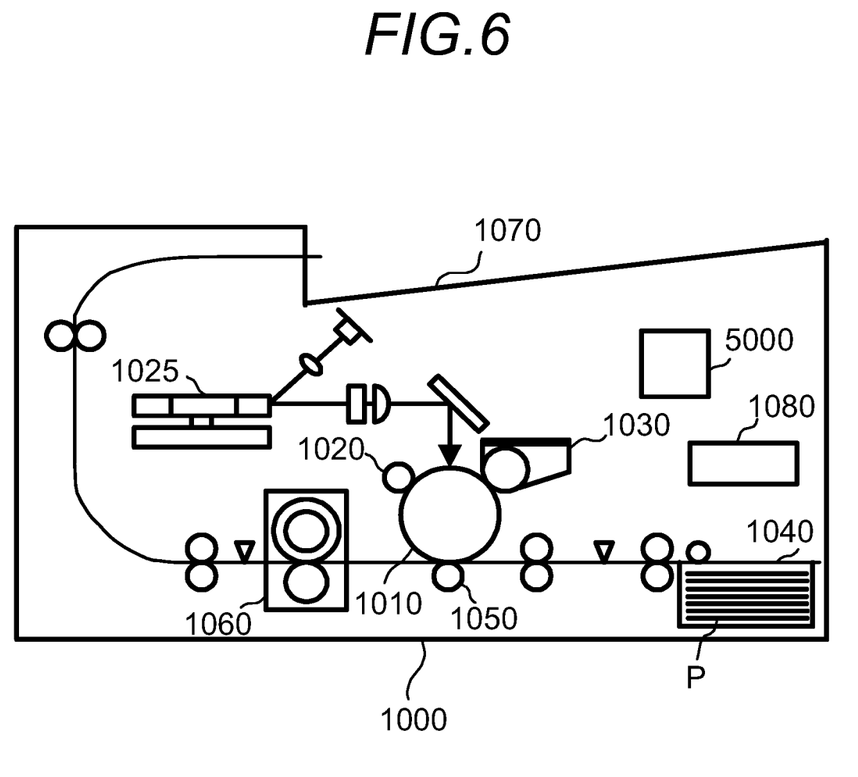
FIG. 6 illustrates a schematic cross-sectional view of an image forming apparatus of Embodiment 4.

FIG. 6 illustrates the schematic configuration of a laser beam printer as an example of the image forming apparatus. A laser beam printer 1000 (hereinafter called the printer 1000) includes a photosensitive drum 1010, a charge unit 1020, and a developing unit 1030. The photosensitive drum 1010 is an image bearing member on which an electrostatic latent image is formed. The charge unit 1020, which is a charge unit, uniformly charges the photosensitive drum 1010. An exposure apparatus 1025, which is an exposure unit, forms an electrostatic latent image according to input image data on the photosensitive drum 1010. The developing unit 1030, which is a developing unit, forms a toner image by developing the electrostatic latent image formed on the photosensitive drum 1010 with a toner. The toner image formed on the photosensitive drum 1010 (on the image bearing member) is transferred to a sheet P as a recording material supplied from a cassette 1040 by a transfer unit 1050, which is a transfer unit. The unfixed toner image transferred to the sheet P is fixed by a fixing device 1060, which is a fixing unit, and discharged to a tray 1070. The photosensitive drum 1010, the charge unit 1020, the developing unit 1030, and the transfer unit 1050 are an image forming unit as an image formation portion.

Additionally, the printer 1000 includes a power supply apparatus 1080, and supplies electric power to a driving unit, such as a motor, and a control unit 5000 from the power supply apparatus 1080. The power supply apparatus 1080 includes the power supply unit 100, the power supply unit 200, or the power supply unit 300 of Embodiments 1 to 3. The power supply unit 100, the power supply unit 200, or the power supply unit 300 supplies a high voltage, which is the output voltage, to at least one of the charge unit 1020, the developing unit 1030, and the transfer unit 1050. The control unit 5000 includes the CPU 3. Table 1 or Table 2 for the frequency f and the duty D of the driving signal S201 corresponding to the output voltage of the transformer 103 are stored in the non-volatile memory 150 included in the power supply unit 100, the power supply unit 200, or the power supply unit 300. By controlling the transformer 103 by the CPU 3 by using Table 1 or Table 2, the influence due to the variation in the inductance value of the transformer 103 can be suppressed, and the output voltage can be output in a wide voltage range with an inexpensive configuration. Note that the image forming apparatus to which the power supply unit 100, the power supply unit 200, or the power supply unit 300 of the present invention can be applied is not limited to the configuration illustrated in FIG. 6, and may be, for example, a color image forming apparatus.

As mentioned above, according to Embodiment 4, the influence due to the variation in the inductance value of a transformer can be suppressed, and the output in a wide voltage range can be achieved with an inexpensive configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-169710, filed Sep. 18, 2019, which is hereby incorporated by reference herein in its entirety.

What is claimed is:
1. A power supply apparatus comprising:
a transformer including a primary winding and a secondary winding;
a switching element connected to the primary winding, the switching element configured to turn on or turn off a voltage applied to the primary winding of the transformer according to an input pulse signal;
a control unit configured to drive the transformer and output the pulse signal to the switching element, to output an output voltage from the power supply apparatus, according to a voltage induced by the secondary winding of the transformer; and
a memory unit configured to store information associating the output voltage with a duty and a frequency of the pulse signal, wherein the control unit switches the frequency and the duty of the pulse signal based on the output voltage and the information stored in the memory unit.

2. A power supply apparatus according to claim 1, wherein the information includes a first frequency corresponding to a first voltage range, and a second frequency corresponding to a second voltage range different from the first voltage range, and
wherein in a case where the power supply apparatus changes the output voltage within the first voltage range, the control unit changes the duty of the pulse signal in a state where the first frequency is selected as the frequency of the pulse signal, and in a case where the power supply apparatus changes the output voltage within the second voltage range, the control unit changes the duty of the pulse signal in a state where the second frequency is selected as the frequency of the pulse signal.

3. A power supply apparatus according to claim 1, wherein the information includes a first duty corresponding to a first voltage range, and a second duty corresponding to a second voltage range different from the first voltage range, and
wherein in a case where the power supply apparatus changes the output voltage within the first voltage range, the control unit changes the frequency of the pulse signal in a state where the first duty is selected as the duty of the pulse signal, and in a case where the power supply apparatus changes the output voltage within the second voltage range, the control unit changes the frequency of the pulse signal in a state where the second duty is selected as the duty of the pulse signal.

4. A power supply apparatus according to claim 1, comprising a feedback unit to which a feedback voltage corresponding to the output voltage is input,
wherein the control unit outputs a target value of the output voltage to the feedback unit, and
wherein in a case where the feedback voltage is higher than the target value, the feedback unit stops driving of the transformer by the switching element, independently of the pulse signal.

5. A power supply apparatus according to claim 1, comprising a detection unit configured to detect a current flowing to a load to which the output voltage is supplied,
wherein the memory unit stores pieces of the information corresponding to the current flowing to the load, and
wherein the control unit selects one among the pieces of the information stored in the memory unit, according to the current detected by the detection unit, and sets the duty and the frequency of the pulse signal.

6. A power supply apparatus according to claim 1, wherein the memory unit stores pieces of the information corresponding to a temperature and/or a humidity, and
wherein the control unit selects one among the pieces of the information stored in the memory unit, according to the temperature and/or the humidity, and sets the duty and the frequency of the pulse signal.

7. An image forming apparatus comprising:
an image bearing member;
an image forming unit configured to act on the image bearing member; and
a power supply apparatus configured to supply a high voltage to the image forming unit,
the power supply apparatus comprising:
a transformer including a primary winding and a secondary winding;
a switching element connected to the primary winding, the switching element configured to turn on or turn off a voltage applied to the primary winding of the transformer according to an input pulse signal;
a control unit configured to drive the transformer and output the pulse signal to the switching element, to output an output voltage from the power supply apparatus, according to a voltage induced by the secondary winding of the transformer; and
a memory unit configured to store information associating the output voltage with a duty and a frequency of the pulse signal,
wherein the control unit switches the frequency and the duty of the pulse signal based on the output voltage and the information stored in the memory unit.

8. An image forming apparatus according to claim 7, wherein the image forming unit includes a charge unit configured to charge the image bearing member, a developing unit configured to develop an electrostatic latent image formed by the image forming unit to form a toner image, and a transfer unit configured to transfer the toner image on the image bearing member to a recording material, and
wherein the power supply apparatus supplies the high voltage to at least one of the charge unit, the developing unit, and the transfer unit.

9. An image forming apparatus according to claim 7, further comprising a circumstance detection unit configured to detect a temperature and/or a humidity,
wherein the memory unit stores pieces of the information, and the control unit selects one among the pieces of the information based on a detection result of the circumstance detection unit.

* * * * *